(12) United States Patent
Chen et al.

(10) Patent No.: US 10,885,139 B2
(45) Date of Patent: *Jan. 5, 2021

(54) SYSTEM AND METHOD FOR AUTOMATED ADDRESS VERIFICATION

(71) Applicant: Trans Union LLC, Chicago, IL (US)

(72) Inventors: Tong Chen, Arlington Heights, IL (US); Susan Baleski, Glendale Heights, IL (US); Alejandro Reskala, Naperville, IL (US)

(73) Assignee: Trans Union LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,909

(22) Filed: Dec. 6, 2019

(65) Prior Publication Data

US 2020/0285679 A1 Sep. 10, 2020

Related U.S. Application Data

(63) Continuation of application No. 15/358,413, filed on Nov. 22, 2016, now Pat. No. 10,503,798.

(60) Provisional application No. 62/259,507, filed on Nov. 24, 2015.

(51) Int. Cl.
 *G06F 16/30* (2019.01)
 *G06F 16/9535* (2019.01)
 *G06F 16/215* (2019.01)
 *G06F 16/9038* (2019.01)
 *G06Q 40/02* (2012.01)

(52) U.S. Cl.
 CPC ........ *G06F 16/9535* (2019.01); *G06F 16/215* (2019.01); *G06F 16/9038* (2019.01); *G06Q 40/025* (2013.01)

(58) Field of Classification Search
 CPC .................................................. G06F 16/215
 See application file for complete search history.

(56) References Cited

U.S. PATENT DOCUMENTS 3,702,010 A 10/1972 Schmidt et al.
6,985,926 B1 * 1/2006 Ferlauto ................ G06F 16/215
 709/206

(Continued)

OTHER PUBLICATIONS

U.S. Appl. No. 15/358,413, filed Nov. 22, 2016.

(Continued)

*Primary Examiner* — Mahesh H Dwivedi
(74) *Attorney, Agent, or Firm* — Neal, Gerber & Eisenberg LLP

(57) ABSTRACT

Various embodiments of the present disclosure provide a system and method for matching two or more addresses. In one embodiment, the system and method includes extracting certain strings or tokens from the addresses, storing the extracted portions into address property containers, and comparing the extracted properties in a layered approach based on the information constructed in the address property containers. In the first layer, the primary properties of the first address are compared to the primary properties of the second address. In the second layer, for each common primary property the modifiers associated with the common primary property of the first address are compared to the modifiers associated with selected primary properties of the second address.

24 Claims, 8 Drawing Sheets

(56) References Cited

U.S. PATENT DOCUMENTS

| | | | |
|---|---|---|---|
| 7,743,043 B2 * | 6/2010 | Winslow | G06F 16/24553 |
| | | | 707/705 |
| 8,996,523 B1 * | 3/2015 | Fisher | G06F 16/215 |
| | | | 707/737 |
| 10,007,739 B1 | 6/2018 | Gundersen et al. | |
| 10,503,798 B2 | 12/2019 | Chen et al. | |
| 2003/0182018 A1 * | 9/2003 | Snapp | G07B 17/00435 |
| | | | 700/225 |
| 2004/0015493 A1 * | 1/2004 | Garner | G06F 16/2468 |
| 2006/0069717 A1 | 3/2006 | Mamou et al. | |
| 2011/0087839 A1 | 4/2011 | Sharma et al. | |
| 2011/0307359 A1 | 12/2011 | Gude et al. | |
| 2013/0097134 A1 | 4/2013 | Thompson et al. | |
| 2013/0097157 A1 | 4/2013 | Ng et al. | |
| 2013/0185317 A1 | 7/2013 | Welton et al. | |
| 2013/0311448 A1 | 11/2013 | Thompson | |
| 2014/0379687 A1 | 12/2014 | Thompson | |

OTHER PUBLICATIONS

The United States Patent and Trademark Office, International Search Report in International Application No. PCT/US16/63256 (dated Feb. 7, 2017).

The United States Patent and Trademark Office, Written Opinion of the International Searching Authority in International Application No. PCT/US16/63256 (dated Feb. 7, 2017).

\* cited by examiner

SYSTEM AND METHOD FOR AUTOMATED ADDRESS VERIFICATION

CROSS-REFERENCE TO RELATED APPLICATION

This application is a continuation of U.S. patent application Ser. No. 15/358,413, filed on Nov. 22, 2016, which claims the benefit of U.S. Provisional Patent Application No. 62/259,507, filed on Nov. 24, 2015, the contents of which are fully incorporated herein by reference.

TECHNICAL FIELD

This invention relates to a system and method for address matching. More particularly, various embodiments of the present disclosure provide a system and method for address matching by extracting certain strings or tokens from the address, storing the extracted properties and associated modifiers into address property containers and comparing the properties in a layered approach based on the information constructed in the address property containers.

BACKGROUND OF THE INVENTION

The consumer lending industry bases its decisions to grant credit or make loans, or to give consumers preferred credit or loan terms, on the general principle of risk, i.e., risk of foreclosure. Credit and lending institutions typically avoid granting credit or loans to high risk consumers, or may grant credit or loans to such consumers at higher interest rates or on other terms less favorable than those typically granted to consumers with low risk. Consumer data, including consumer credit information, is collected and used by credit bureaus, financial institutions, and other entities for assessing creditworthiness and aspects of a consumer's financial and credit history.

In many emerging and developing markets, the available consumer data may be of a lower quality as compared to consumer data available in developed markets. For example, records of consumer data may not include a unique identification number, formats of addresses may vary, dates of birth may be unreliable or non-existent, name conventions may vary, and particular names and surnames may be very popular and duplicated among a large number of people. Traditional consumer data search algorithms that are often used in developed markets do not always perform well on consumer data in emerging markets. Such traditional algorithms rely on consistent formatting of consumer data, more complete information, and information that is in discrete fields, such as house number, street name, telephone, postal code, and identification number. In developed markets, searches on consumer data may be performed relatively quickly by using a well-indexed relational database key that uses a single field, e.g., identification number or telephone, or a composite key, e.g., date of birth and name, name and house number, etc.

In particular, matching addresses in consumer data may be useful in many situations, such as determining whether database records should be merged, de-duplication of addresses for a particular consumer, verifying an address match during a dispute process, or other situations. Using traditional algorithms to match addresses that are contained in a single field may result in overmatching, i.e., false positives, for addresses with similar alphabetic and/or numerical values that are not actually matches; and/or undermatching, i.e., false negatives, for addresses that are actually matches but are not detected as matches. Accordingly, the usefulness of search results that are further filtered based on matching of addresses may be reduced if false positives are included and/or false negatives are not included. Furthermore, merging records based on false positives and/or false negatives of matched addresses may also contribute to incorrect database records.

Therefore, there is a need for an improved system and method that can accurately match addresses and account for the formatting and quality issues with consumer data that may be present in emerging markets, in order to, among other things, reduce overmatching and undermatching of addresses.

SUMMARY OF THE INVENTION

The invention is intended to solve the above-noted problems by providing systems and methods for matching addresses. In systems that manipulate address records, the addresses are typically stored using several database columns such as state, province, city, street address lines, etc. While the content for state, province and city are usually well-defined, the street address lines are often in free format text. When a query or comparison on an address record is performed, the matching of street address lines poses the biggest challenge to match algorithms.

Various embodiments of the present disclosure include a system and method for determining whether two or more addresses match by causing a processor to extract certain strings or tokens from the addresses into address property containers and comparing the extracted properties and associated modifiers in a layered approach based on the information constructed in the address property containers. More specifically, in various embodiments, after verifying the content for state, province and city are a match, the address matching system and method of the present disclosure compares the street address portion of the address to determine whether the two or more addresses are a match. The street addresses are treated as alphanumeric free format text with certain strings or tokens defined as primary properties and the strings or tokens surrounding each primary property defined as the associated modifiers. In one embodiment, the primary properties of an address are the numbers in free format text from the street address. The text strings on either side of each primary property are referred to as modifiers associated with the primary properties. The address matching system and method of the present disclosure includes extracting the primary properties and their associated modifiers from the street address, storing the primary properties and associated modifiers into address property containers, and comparing the addresses in a layered approach based on the information constructed in the address property containers.

In this embodiment, the first stage, or layer, of matching includes comparing the primary properties of the addresses for a mismatch determination. A mismatch determination results if there is at least one primary property of the target address in conflict with the primary properties of the base address, and vice versa. A mismatch determination can be made immediately without consideration of any other part of the address. If the primary property comparison results in a mismatch determination, the processor rejects the addresses as unmatched. If there is no primary property of the first address in conflict with the primary properties of the second address, and vice versa, the second stage or layer of matching is initiated.

In this embodiment, the second layer of matching includes comparing the modifiers associated with each primary property. The modifiers associated with a first primary property of a first address are compared to the modifiers associated with the selected primary properties of a second address. In certain embodiments, the modifiers themselves are analyzed and fed back into the main algorithm to extract primary properties from within themselves based on the nature and complexity of the address data. If it is determined that there is no further need to extract primary properties from the modifiers, the second layer also becomes the last layer in the overall address match process.

It should be appreciated that the threshold of the comparison on modifiers varies based on the characteristics of addresses including primary property matching result as well as external factors such as the market and the source of addresses. For example, when comparing modifiers of addresses with strong primary property match i.e. higher number of matching primary properties, the threshold is different than when comparing modifiers of addresses with weak primary property match i.e. lower number of matching primary properties. The likelihood of two addresses being the same with high number of primary properties matching exactly is higher than two addresses with weaker primary property match.

These and other embodiments, and various permutations and aspects, will become apparent and be more fully understood from the following detailed description and the accompanying drawings, which set forth illustrative embodiments that are indicative of the various ways in which the principles of the invention may be employed.

DETAILED DESCRIPTION OF THE INVENTION

Figure 1:
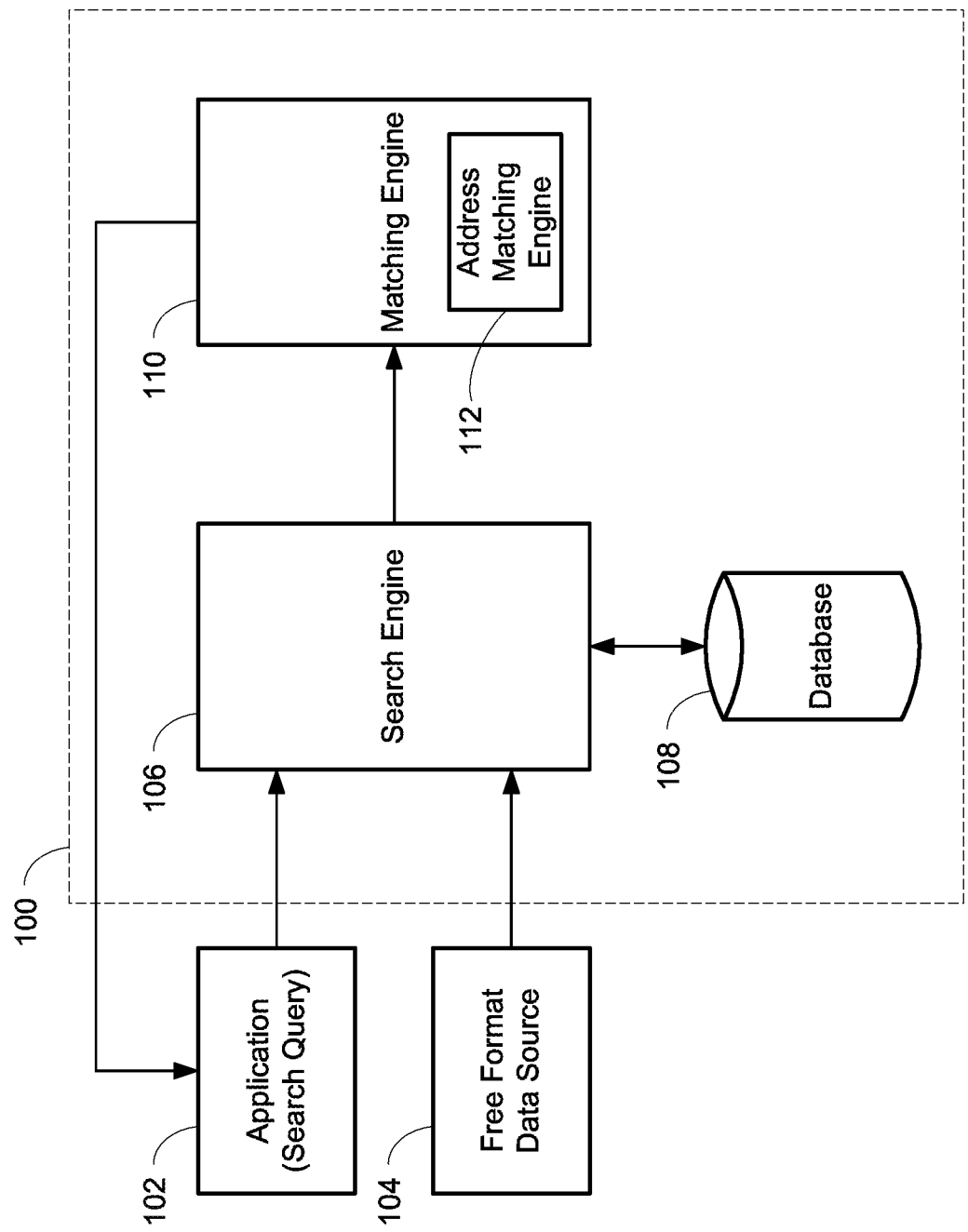
FIG. 1 is a block diagram illustrating a system including an address matching engine.

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

Various embodiments of the present disclosure include a system and method for determining whether two or more addresses match by causing a processor to extract certain strings or tokens from the addresses into address property containers and comparing the extracted properties and associated modifiers in a layered approach based on the information constructed in the address property containers. More specifically, in various embodiments, after verifying the content for state, province and city are a match, the address matching system and method of the present disclosure compares the street address portion of the address to determine whether the two or more addresses are a match. The street addresses are treated as alphanumeric free format text with certain strings or tokens defined as primary properties and the strings or tokens surrounding each primary property defined as the associated modifiers. In one embodiment, the primary properties of an address are the numbers in free format text from the street address. The text strings on either side of each primary property are referred to as modifiers associated with the primary properties. The address matching system and method of the present disclosure includes extracting the primary properties and their associated modifiers from the street address, storing the primary properties and associated modifiers into address property containers, and comparing the addresses in a layered approach based on the information constructed in the address property containers.

In this embodiment, the first stage, or layer, of matching includes comparing the primary properties of the addresses for a mismatch determination. A mismatch determination results if no primary properties from the target address match the primary properties of the base address. A mismatch determination can be made immediately without consideration of any other part of the address. If the primary property comparison results in a mismatch determination, the processor rejects the addresses as unmatched. If there is no primary property of the first address in conflict with the primary properties of the second address, and vice versa, the second stage or layer of matching is initiated.

In this embodiment, the second layer of matching includes comparing the modifiers associated with each primary property. The modifiers associated with a first primary property of a first address are compared to the modifiers associated with the selected primary property of a second address. In certain embodiments, the modifiers themselves are analyzed and fed back into the main algorithm to extract primary properties from within themselves based on the nature and complexity of the address data. If it is determined that there is no further need to extract primary properties from the modifiers, the second layer also becomes the last layer in the overall address match process.

Turning to FIG. 1, which is a block diagram of a search system including a matching engine according to one embodiment of the present disclosure. FIG. 1 illustrates a search system 100 for the retrieval and matching of database records, including an embodiment of matching of addresses in search queries and/or database records, in accordance with one or more principles of the invention. The system 100 may utilize information derived from a free format data source 104 loaded into the system 100 and/or information from a search query transmitted to the system 100 to return a set of records as a search result set. The system 100 may be part of a larger system, such as the International Credit Reporting System (iCRS) from TransUnion.

Figure 3:
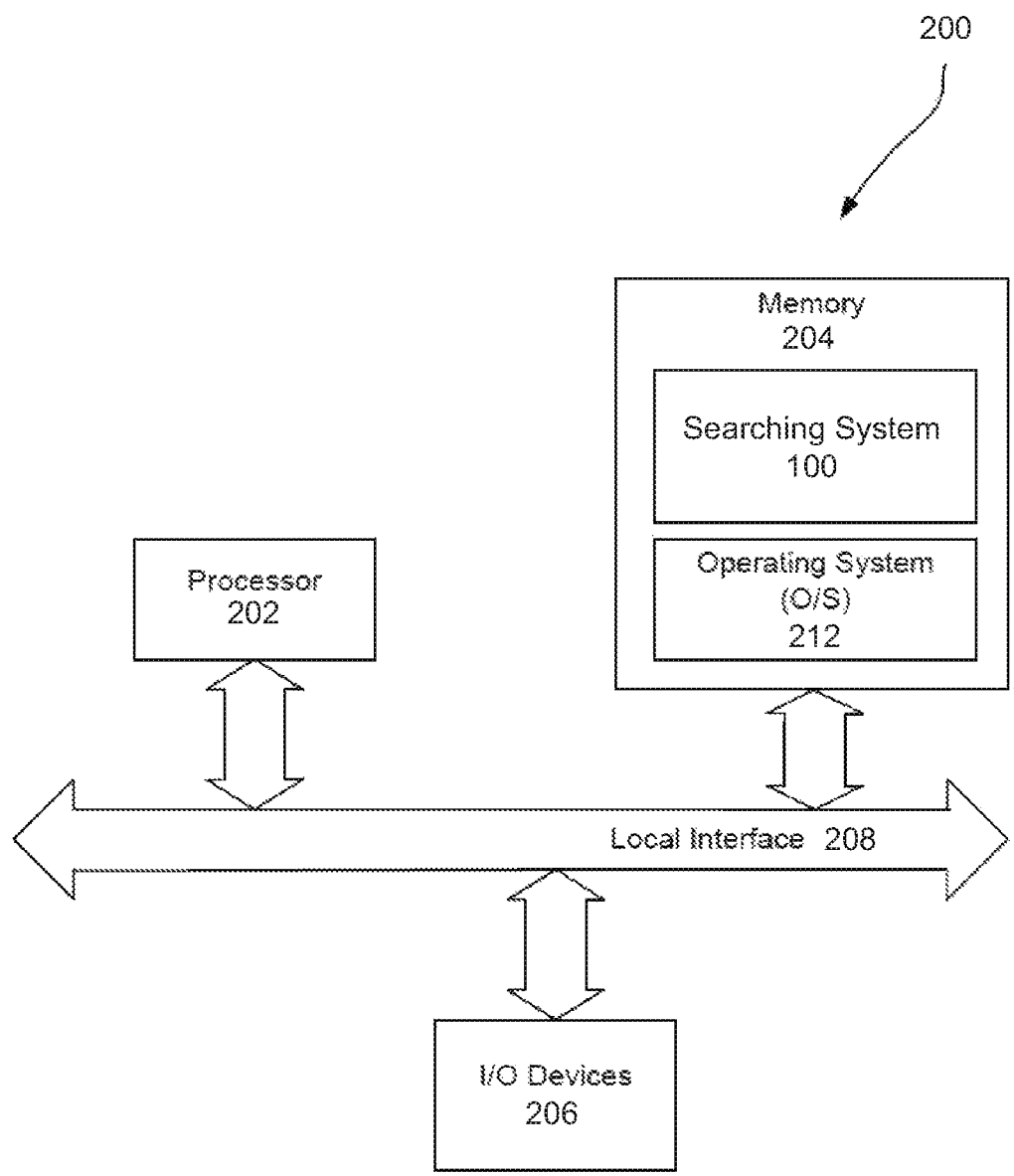
FIG. 3 is a block diagram of one form of a computer or server of FIGS. 1 and 2, having a memory element with a computer readable medium for implementing the system including an address matching engine.

Various components of the system 100 may be implemented using software executable by one or more servers or computers, such as a computing device 300 with a processor 202 and memory 204 as shown in FIG. 3, which is described in more detail below. In one embodiment, the system 100 can perform refined matching on a set of initially retrieved database records. The set of initially retrieved records may be found by a search engine 106 from a database 108, and a matching engine 110 that includes an address matching engine 112 may further process the initially retrieved records to find a more accurate set of results, based on the initial search query. In another embodiment, the address matching engine 112 may perform comparisons on a set of database records, based on the addresses in each of the records. The comparisons may be performed to determine whether the records should be merged, for example, or to determine whether the records match. A socket server (not shown) may be included in the system 100 to manage connections with client applications. Multiple requests may be sent through the socket server when a socket connection is maintained, or a new socket connection may be required for each request.

An application 102 may generate and initiate a search query to retrieve one or more results from the database 108 that is derived from the data in the free format data source 104. The search query may be intended to retrieve the record of a particular subject consumer. The application 102 may be a software application, for example, that is executing at a credit bureau and/or at a member of the credit bureau, including financial institutions, insurance companies, utility companies, etc. that wish to retrieve data related to a consumer, such as credit information, for a permissible purpose. For example, a search query may be initiated by a bank when a consumer applies for a loan so that the bank can examine the consumer's credit report to assess the creditworthiness of the consumer. The bank can input the consumer's personal identifying information in the search query in order to retrieve the credit report. The application 102 may transmit a message that contains the search query to the system 100, and in particular, the search engine 106. The message may be in a defined JSON (JavaScript Object Notation) format, Extensible Markup Language (XML), or other format. Search results from the search engine 106 may be further refined by the matching engine 110 and the address matching engine 112. The refined results of the search initiated by the search query may be returned to the application 102 by the matching engine 110.

A free format data source 104 may include raw consumer data that is not consistently formatted and/or is unstructured. Consumer data may include identifying information about a consumer as well as financial-related data, such as the status of debt repayment, on-time payment records, etc. Consumer data in the free format data source 104 may originate from a variety of sources, such as from public records, e.g., deeds, bankruptcy records, etc.; and members of credit bureaus, including financial institutions, insurance companies, utility companies, etc. The free format data source 104 may include minimal and/or incomplete identifying information in each record corresponding to a customer. Names and addresses in the free format data source 104 may be arbitrary, vague, and/or non-specific. For example, addresses in the free format data source 104 may include "near the railway station, Guntur", "the red house south of Joggers park", or "over by the water tank 30 steps from the village square". Such addresses may be valid and can receive mail but are non-specific as compared to the address formats used in developed markets. Each of the addresses may be contained in an inconsistent number of fields and/or may be arbitrarily divided into a single field or multiple fields. Other data in the free format data source 104 may be duplicative and therefore not unique enough to positively identify a particular consumer by itself. For example, the same account number may be used for loan accounts corresponding to different consumers at different branches of the same bank. In this case, further identifying information must be used to uniquely identify a particular consumer.

Raw data from the free format data source 104 may be processed by the search engine 106 and placed in the database 108. In some embodiments, the raw data may be normalized by the search engine 106 and placed in the database 108. Search queries to the search engine 106 may be used to retrieve an initial set of records from the database 108. In some embodiments, the search queries may be normalized and/or transformed by the search engine 106 prior to being executed. Normalization of the raw data and search queries into a condensed normalized format may allow for fuzzier matching of data. A portion or all of the raw data and search queries, such as names, addresses, dates of birth, etc., may be normalized. Normalization can include using exact and pattern substitutions using regular expressions to standardize the data so that fields in a search query may match the corresponding data in the database 108 since both the fields and the data have been normalized.

Transformation of the search queries can include applying alterations to the search queries to allow the queries to be more expansive and inclusive than as specified in the original search queries. Transformed search queries may be sent with or without the original normalized search queries. Transformation rules may be customized for the particular market related to the free format data source. Embodiments of a search engine 106 are disclosed in a commonly-assigned non-provisional application, titled "System and Method for Subject Identification From Free Format Data Sources" (U.S. patent application Ser. No. 13/539,053), which is hereby incorporated by reference in its entirety. Search engines utilizing any type of searching algorithm may also be implemented in the search engine 106.

The matching engine 110 and the address matching engine 112 may process the search query and/or the initial set of records retrieved by the search engine 106 from the database 108. A refined set of search results that more accurately match the search query may be returned to the application 102 by the matching engine 110. Embodiments of a matching engine 110 are disclosed in a commonly-assigned non-provisional application, titled "System and Method for Matching of Database Records Based on Similarities to Search Queries" (U.S. patent application Ser. No. 13/538,926), which is hereby incorporated by reference in its entirety.

Figure 2:
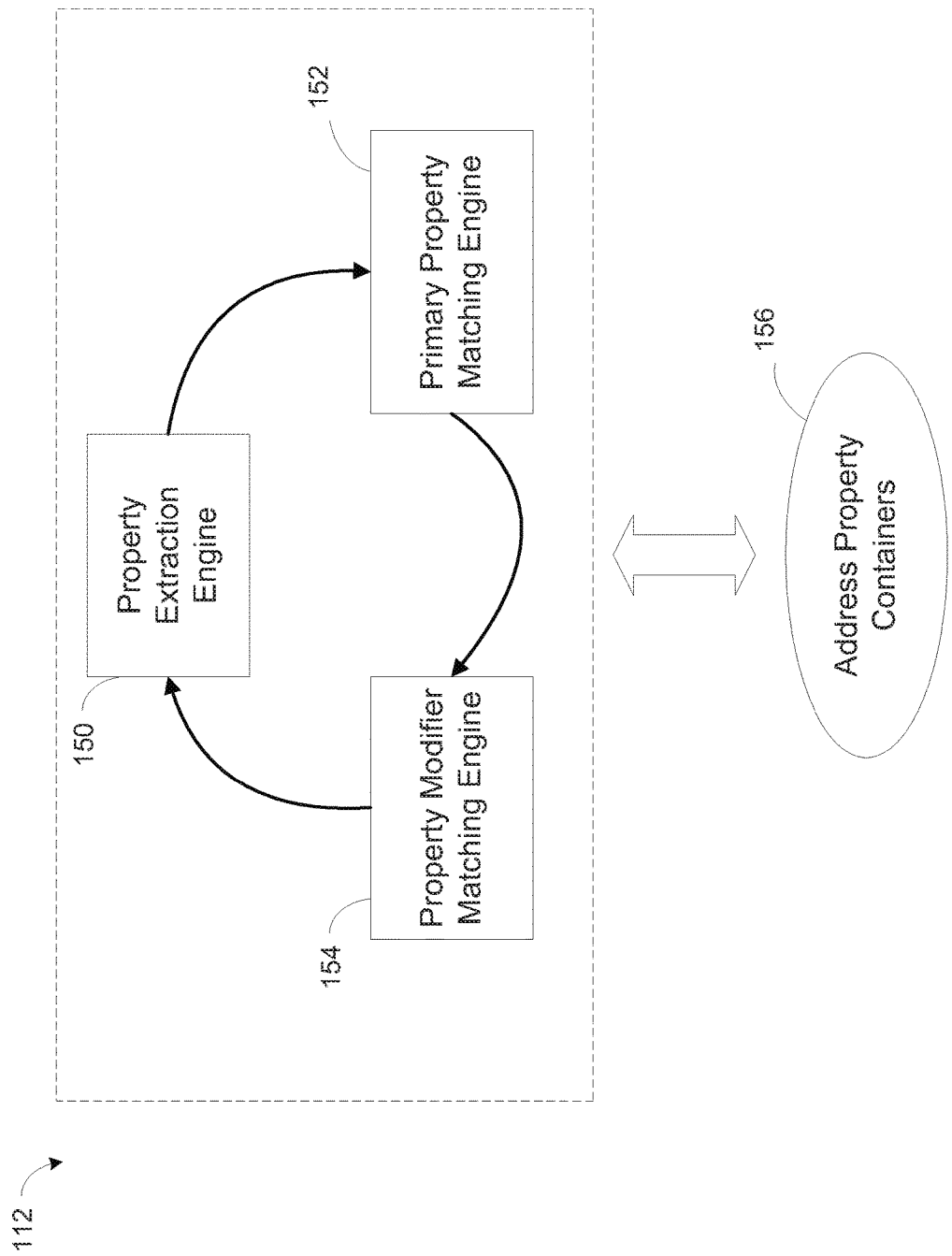
FIG. 2 is a block diagram illustrating an address matching engine for matching of addresses based on the primary properties and associated modifiers of the address and a layered matching analysis the addresses.

FIG. 2 illustrates the address matching engine 112 that may match addresses to one another for evaluating the similarities between addresses. In one embodiment, the address matching engine 112 may be used as part of a matching engine 110 that receives addresses in database records from a search engine 106, as described above. In other embodiments, the address matching engine 112 may be used by itself or in conjunction with other systems in order to match addresses from any source, such as a data file or other media. For example, the address matching engine 112 may be utilized to de-duplicate multiple addresses for a particular consumer or verify an address match during a dispute process.

The address matching engine 112 includes a property extraction engine 150, a primary property matching engine 152 and a property modifier matching engine 154. To perform an analysis of the free format address, the address matching engine 112 receives two or more addresses in free format text. The matching engine 112 may receive the addresses from a source, such as a database, search query, file, or other media. The number of addresses received may vary, depending on the desired usage of the address matching engine 112. For example, an input address and one or more candidate addresses may be transmitted to the address matching engine 112 so that the input address may be compared to the candidate addresses. As another example, multiple input addresses and multiple candidate addresses may be transmitted to the address matching engine 112 so that each of the input addresses may be compared to the multiple candidate addresses.

After receiving the addresses to the address matching engine 112, certain strings and tokens of each of the addresses are extracted and stored into address property containers 156 at the property extraction engine 150. More specifically, the property extraction engine 150 may deterministically evaluate strings in the addresses and deconstruct the addresses to extract the primary properties of the address and their associated modifiers. In one embodiment, the primary properties of the addresses are any numbers within the addresses. The modifiers are the strings or tokens (i.e., characters, letters, symbols, spaces) on either side of each primary property. The extracted primary properties and associated modifiers of an input address are stored into an address property container 156. Each primary property is linked with its corresponding modifiers in the address property container 156.

The first layer of the address matching system and method includes comparing the primary properties of the addresses at the primary property matching engine 152. More specifically, in this first stage, or layer, of matching, the primary properties are compared for a mismatch determination. A mismatch determination results if there is at least one primary property of the target address in conflict with the primary properties of the base address, and vice versa. A mismatch determination can be made immediately without consideration of any other part of the address. If the primary property comparison results in a mismatch determination, the processor rejects the addresses as unmatched.

If, on the other hand, there is no primary property of the first address in conflict with the primary properties of the second address, and vice versa, the second stage or layer of matching is initiated at the property modifier matching engine 154. More specifically, the associated modifiers for a first primary property in a first address is compared to the associated modifiers for the selected primary properties in the second address.

In certain embodiments, where the addresses being compared do not include any primary properties, the first layer of the comparison bears little weight. More specifically, if a first address and a second address do not include any primary properties (i.e., numbers), the primary property comparison does not result in a match or a mismatch. In such an embodiment, the strings and number of tokens are analyzed in the modifier matching engine 154 to determine whether there is a match. The comparison may include direct matching of data, matching characters from strings, matching and/or expanding initials or acronyms, configurable phonetic matching, awareness of and/or ignoring noise words (e.g., "and", "to", "site"), configurable known replacement strings, fuzzy string algorithms, word concatenation algorithms, pluralization algorithms, numerical versus non-numerical token analysis, and/or other techniques. In this embodiment, the second layer of comparison is given more weight than the first layer of comparison. In certain embodiments, depending on the complexity of the free format text in addresses, the modifiers of primary properties contain a different layer of properties that can be extracted in modifier comparison. In such embodiments, the modifiers are fed back into property extraction engine 150 to drive the address matching recursively as illustrated in FIG. 2.

FIG. 3 is a block diagram of a computing device 200 housing executable software used to facilitate the search system 100 and/or the address matching engine 112. One or more instances of the computing device 200 may be utilized to implement any, some, or all of the components in the system 100, including the search engine 106, the matching engine 110, and the address matching engine 112. Computing device 200 includes a memory element 204. Memory element 204 may include a computer readable medium for implementing the system 100, and for implementing particular system transactions. Memory element 204 may also be utilized to implement the database 108. Computing device 200 also contains executable software, some of which may or may not be unique to the system 100.

In some embodiments, the system 100 is implemented in software, as an executable program, and is executed by one or more special or general purpose digital computer(s), such as a mainframe computer, a commodity server, a personal computer (desktop, laptop or otherwise), personal digital assistant, or other handheld computing device. Therefore, computing device 200 may be representative of any computer in which the system 100 resides or partially resides.

Generally, in terms of hardware architecture as shown in FIG. 3, computing device 200 includes a processor 202, a memory 204, and one or more input and/or output (I/O) devices 206 (or peripherals) that are communicatively coupled via a local interface 208. Local interface 208 may be one or more buses or other wired or wireless connections, as is known in the art. Local interface 208 may have additional elements, which are omitted for simplicity, such as controllers, buffers (caches), drivers, transmitters, and receivers to facilitate external communications with other like or dissimilar computing devices. Further, local interface 208 may include address, control, and/or data connections to enable internal communications among the other computer components.

Processor 202 is a hardware device for executing software, particularly software stored in memory 204. Processor 202 can be any custom made or commercially available processor, such as, for example, a Core series or vPro processor made by Intel Corporation, or a Phenom, Athlon or Sempron processor made by Advanced Micro Devices, Inc. In the case where computing device 200 is a server, the processor may be, for example, a Xeon or Itanium processor from Intel, or an Opteron-series processor from Advanced Micro Devices, Inc. Processor 202 may also represent multiple parallel or distributed processors working in unison.

Memory 204 can include any one or a combination of volatile memory elements (e.g., random access memory (RAM, such as DRAM, SRAM, SDRAM, etc.)) and non-volatile memory elements (e.g., ROM, hard drive, flash drive, CDROM, etc.). It may incorporate electronic, magnetic, optical, and/or other types of storage media. Memory 204 can have a distributed architecture where various components are situated remote from one another, but are still accessed by processor 202. These other components may reside on devices located elsewhere on a network or in a cloud arrangement.

The software in memory 204 may include one or more separate programs. The separate programs comprise ordered listings of executable instructions for implementing logical functions. In the example of FIG. 3, the software in memory 204 may include the system 100 in accordance with the invention, and a suitable operating system (O/S) 212. Examples of suitable commercially available operating systems 212 are Windows operating systems available from Microsoft Corporation, Mac OS X available from Apple Computer, Inc., a Unix operating system from AT&T, or a Unix-derivative such as BSD or Linux. The operating system O/S 212 will depend on the type of computing device 200. For example, if the computing device 200 is a PDA or handheld computer, the operating system 212 may be iOS for operating certain devices from Apple Computer, Inc., PalmOS for devices from Palm Computing, Inc., Windows Phone 8 from Microsoft Corporation, Android from Google, Inc., or Symbian from Nokia Corporation. Operating system 212 essentially controls the execution of other computer programs, such as the system 100, and provides scheduling, input-output control, file and data management, memory management, and communication control and related services.

If computing device 200 is an IBM PC compatible computer or the like, the software in memory 204 may further include a basic input output system (BIOS). The BIOS is a set of essential software routines that initialize and test hardware at startup, start operating system 212, and support the transfer of data among the hardware devices. The BIOS is stored in ROM so that the BIOS can be executed when computing device 200 is activated.

Steps and/or elements, and/or portions thereof of the invention may be implemented using a source program, executable program (object code), script, or any other entity comprising a set of instructions to be performed. Furthermore, the software embodying the invention can be written as (a) an object oriented programming language, which has classes of data and methods, or (b) a procedural programming language, which has routines, subroutines, and/or functions, for example but not limited to, C, C++, C#, Pascal, Basic, Fortran, Cobol, Perl, Java, Ada, and Lua. Components of the system 100 may also be written in a proprietary language developed to interact with these known languages.

I/O device 206 may include input devices such as a keyboard, a mouse, a scanner, a microphone, a touch screen, a bar code reader, or an infra-red reader. It may also include output devices such as a printer, a video display, an audio speaker or headphone port or a projector. I/O device 206 may also comprise devices that communicate with inputs or outputs, such as a short-range transceiver (RFID, Bluetooth, etc.), a telephonic interface, a cellular communication port, a router, or other types of network communication equipment. I/O device 206 may be internal to computing device 200, or may be external and connected wirelessly or via connection cable, such as through a universal serial bus port.

When computing device 200 is in operation, processor 202 is configured to execute software stored within memory 204, to communicate data to and from memory 204, and to generally control operations of computing device 200 pursuant to the software. The system 100 and operating system 212, in whole or in part, may be read by processor 202, buffered within processor 202, and then executed.

In the context of this document, a "computer-readable medium" may be any means that can store, communicate, propagate, or transport data objects for use by or in connection with the system 100. The computer readable medium may be for example, an electronic, magnetic, optical, electromagnetic, infrared, or semiconductor system, apparatus, device, propagation medium, or any other device with similar functionality. More specific examples (a non-exhaustive list) of the computer-readable medium would include the following: an electrical connection (electronic) having one or more wires, a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and stored in a computer memory. The system 100 can be embodied in any type of computer-readable medium for use by or in connection with an instruction execution system or apparatus, such as a computer.

For purposes of connecting to other computing devices, computing device 200 is equipped with network communication equipment and circuitry. In a preferred embodiment, the network communication equipment includes a network card such as an Ethernet card, or a wireless connection card. In a preferred network environment, each of the plurality of computing devices 200 on the network is configured to use the Internet protocol suite (TCP/IP) to communicate with one another. It will be understood, however, that a variety of network protocols could also be employed, such as IEEE 802.11 Wi-Fi, address resolution protocol ARP, spanning-tree protocol STP, or fiber-distributed data interface FDDI. It will also be understood that while a preferred embodiment of the invention is for each computing device 200 to have a broadband or wireless connection to the Internet (such as DSL, Cable, Wireless, T-1, T-3, OC3 or satellite, etc.), the principles of the invention are also practicable with a dialup connection through a standard modem or other connection means. Wireless network connections are also contemplated, such as wireless Ethernet, satellite, infrared, radio frequency, Bluetooth, near field communication, and cellular networks.

Figure 4:
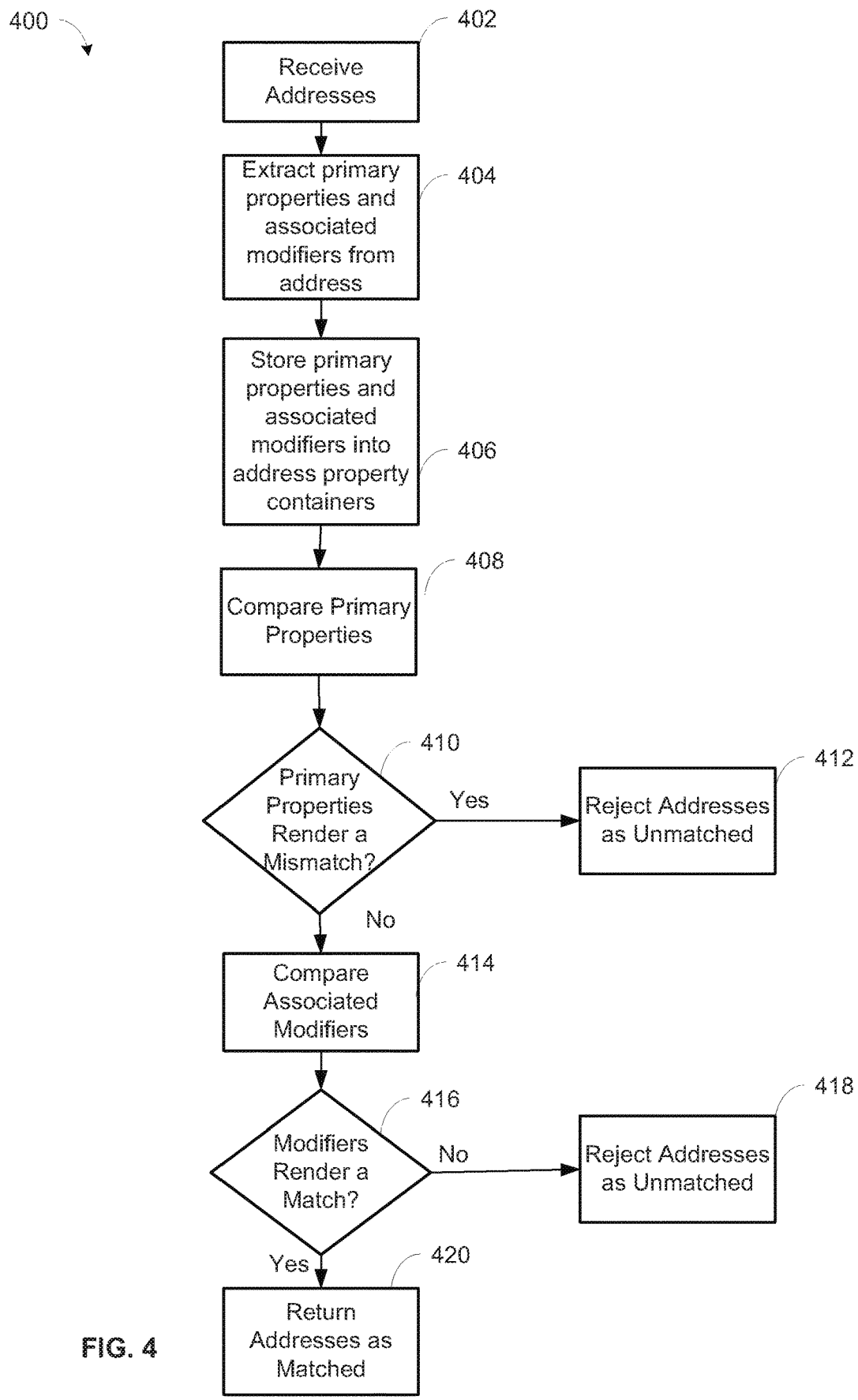
FIG. 4 is a flowchart illustrating operations for one embodiment of performing the layered address matching analysis of the present disclosure.

Turning to FIG. 4, which illustrates a flowchart of one embodiment of a process 400 for operating the address matching system and method of the present disclosure. In one embodiment, this process 400 is embodied in one or more software programs stored in one or more memories and executed by one or more processors or servers. Although this process 400 is described with reference to the flowchart illustrated in FIG. 4, it should be appreciated that many other methods of performing the acts associated with these processes may be used. For example, the order of certain steps described may be changed, or certain steps described may be optional.

In various embodiments, the process 400 can result in the determination that an input address and a candidate address are a match. In some embodiments, the address match determination may assist in the refinement of a set of search results from a search engine 106 through merging of matching database records. The address matching engine 112 may perform all or part of the process 400.

At step 402, addresses may be received at the address matching engine 112. The addresses may be received from any source and the number of addresses that are received at the engine 112 may vary. In one embodiment, the addresses may be from a set of retrieved search records of a search query that were received from a search engine 106 and/or an application 102. The records may have been retrieved from the database 108 by the search engine 106 based on a search query received from the application 102. In another embodiment, the addresses may be from a source or application that wishes to compare one or more input addresses to one or more candidate addresses to determine their similarities.

At step 404, primary properties and the associated modifiers are extracted from the addresses by the property extraction engine 150. More specifically, the property extraction engine 150 may deterministically evaluate strings in the addresses and deconstruct the addresses to extract the primary properties of the address and their associated modifiers. In one embodiment, the primary properties of an address are the numbers within the address and the associated modifiers are the strings on either side of each primary property. For example, in terms of address lines, numbers contained in a street address are considered the primary properties and the characters (or lack thereof) on either side of each number are the modifiers associated with each primary property.

At step 406, the extracted primary properties and associated modifiers of an input address are stored into an address property container. Each primary property is linked with its corresponding modifiers in the address property container.

At step 408, the primary properties of the two or more addresses are compared at the primary property matching engine 152. The primary properties of a first address are compared to the primary properties of a second address to determine whether the two addresses have no primary property (i.e., number) in conflict with each other. At step 410, the process 400 includes determining whether the primary property comparison renders a mismatch. If there is at least one primary property in conflict between the two or more addresses, the result is a mismatch and the process 400 includes rejecting the address as unmatched as indicated by block 412.

If, on the other hand, there is no primary property in conflict between the addresses, the process 400 continues to the second layer of the address matching analysis at step 414, which includes comparing the associated modifiers at the property modifier matching engine 154. More specifically, the associated modifiers for a primary property in one address is compared to the associated modifiers for the selected primary properties in the second address.

At step 416, the process 400 includes determining whether the modifiers render a match. In one embodiment, if at least one modifier associated with each primary property of a first address matches with at least one modifier associated with the corresponding primary property of a second address, the process 400 determines that the addresses are a match.

If the modifiers do not match, the process 400 includes rejecting the address as unmatched, as indicated by block 418. If on the other hand, the modifiers sufficiently match, the process 400 includes returning the address as matched, as indicated by block 420.

It should be appreciated that in various embodiments, the threshold of comparison on modifiers varies based on the characteristics of addresses including primary property matching result as well as external factors such as the market and the source of addresses. For example, when comparing modifiers of addresses with strong primary property match i.e. higher number of matching primary properties, the threshold is different than when comparing modifiers of addresses with weak primary property match i.e. lower number of matching primary properties. The likelihood of two addresses being the same with high number of primary properties matching exactly is higher than two addresses with weaker primary property match. As such, in certain alternative embodiments, the threshold of comparison may require less matching between the modifiers. For example, in certain embodiments two addresses may be deemed a match so long as at least one modifier associated with at least one common primary property of a first address matches at least one modifier associated with the corresponding common primary property of the second address. In other embodiments, the threshold of comparison may require more matching between the modifiers.

Figure 5A:
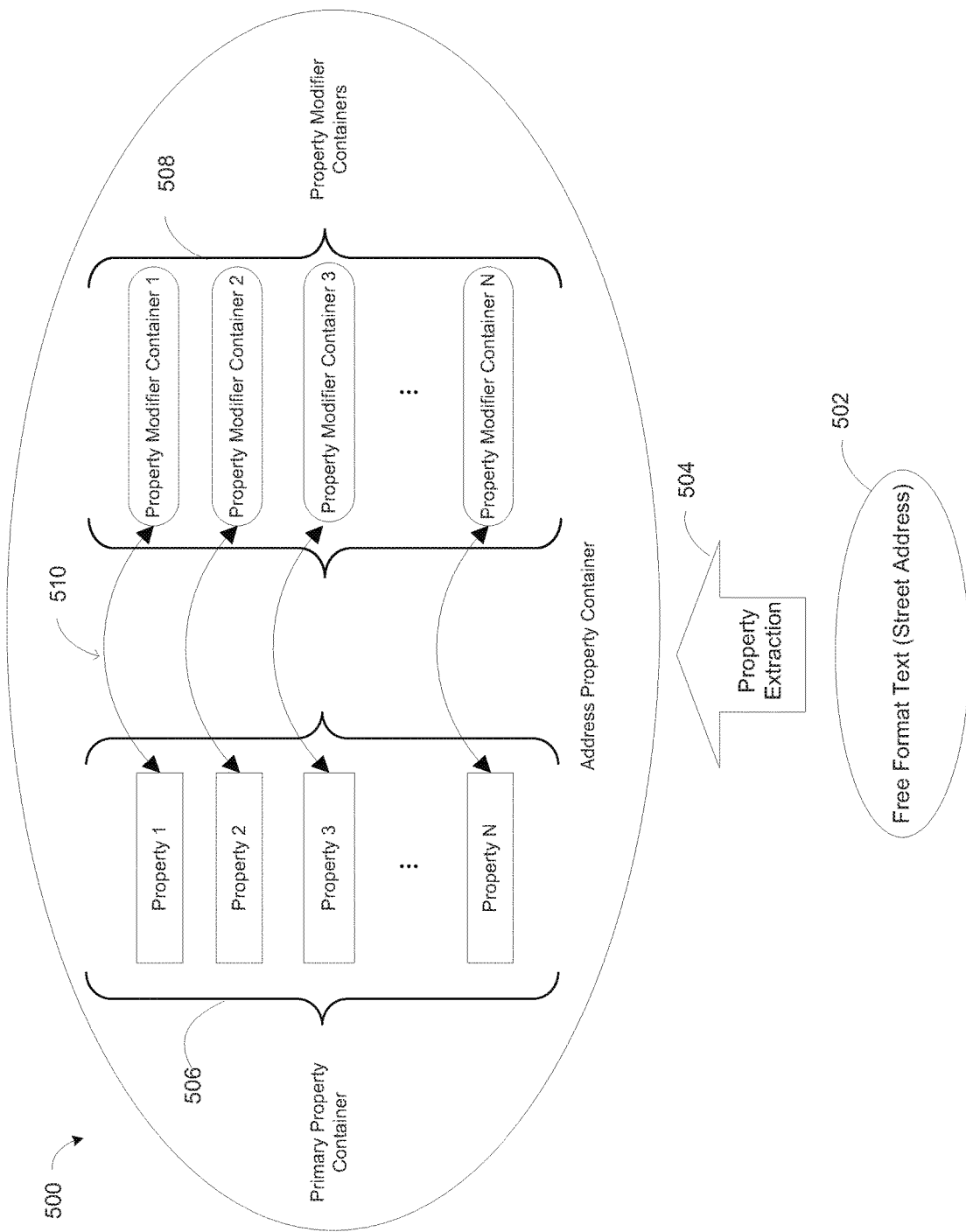
FIGS. 5A-5C are diagrams illustrating operations for one embodiment of performing the layered address matching analysis of the present disclosure
Figure 5B:
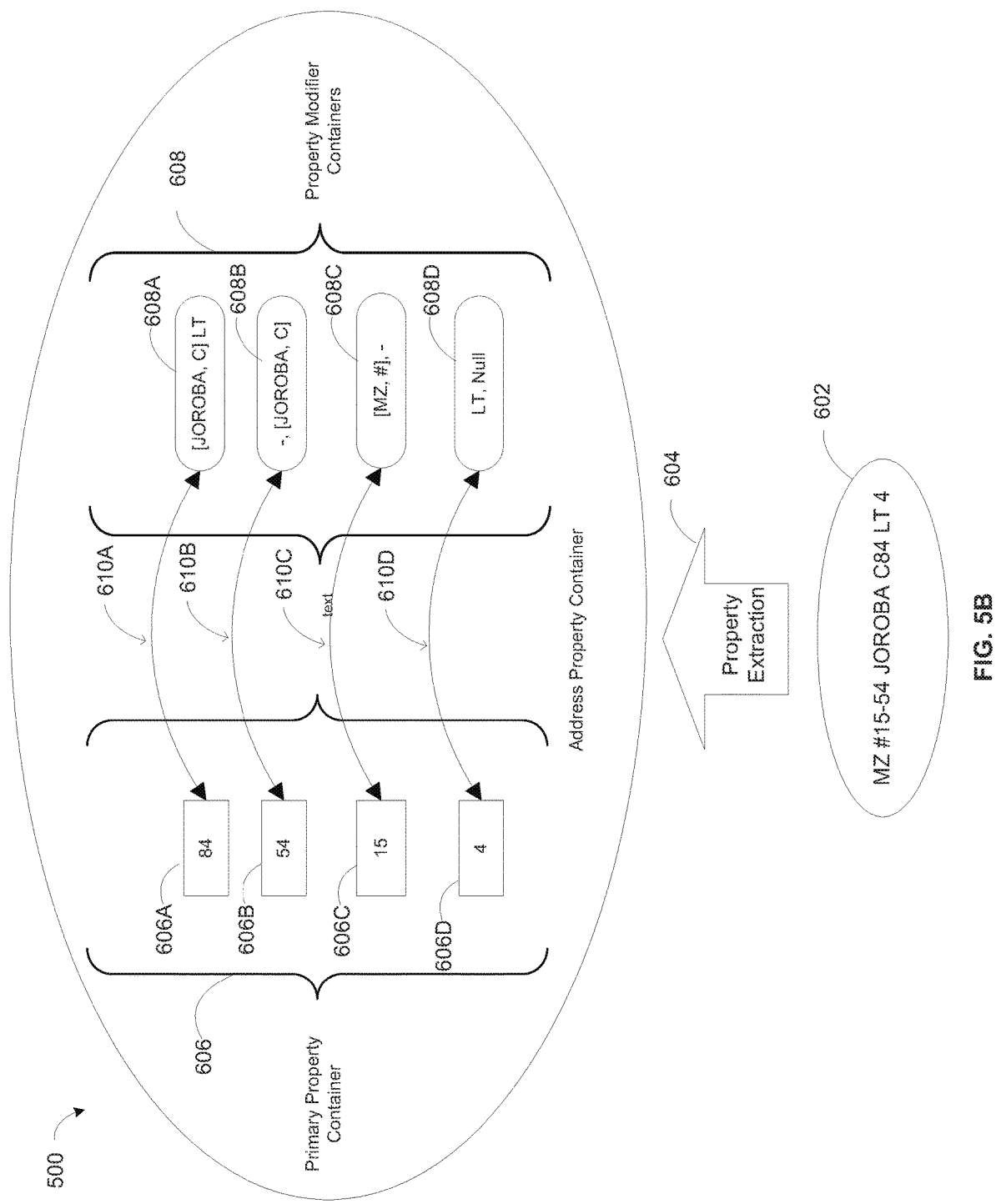
Figure 5C:
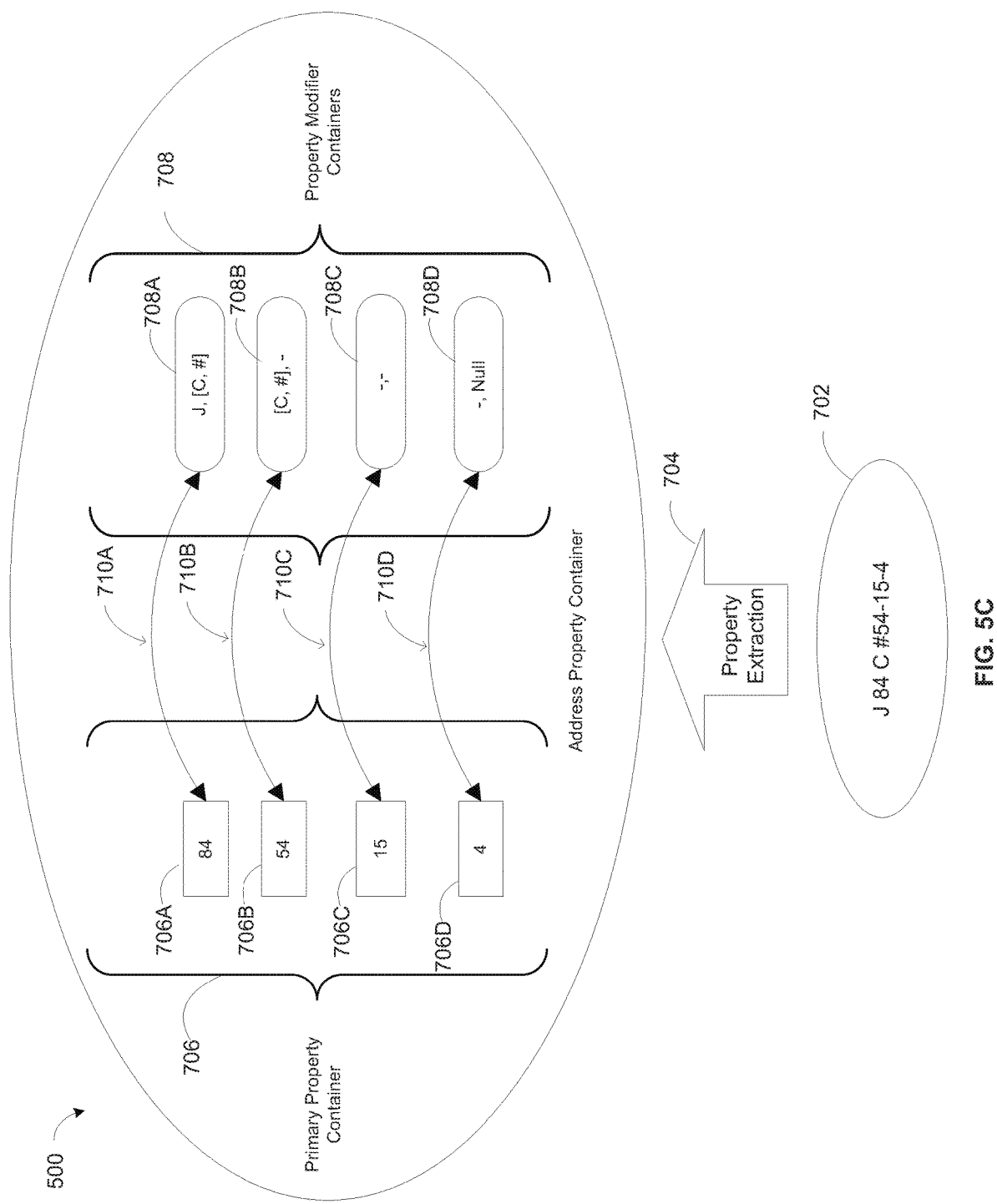

Turning to FIG. 5A, which illustrates a diagram of the process 500 of extracting and storing primary properties and associated modifiers at the property extraction engine 150. As depicted in FIG. 5A, an address 502 in free format text is received at a processor. The primary properties and associated modifiers are extracted from the address as indicated by arrow 504. The primary properties of the address are extracted and stored into a primary property container 506. The modifiers associated with each primary property are extracted and stored into property modifier containers 508 that are linked to the respective primary properties, as indicated by the arrows 510. FIGS. 5B and 5C illustrate a diagram of one example embodiment of the process 500 depicted in FIG. 5A. FIG. 5B illustrates the process 500 with respect to a first address 602 and FIG. 5C illustrates the process 500 with respect to a second address 702.

Turning to FIG. 5B, which illustrates the first address 602 is received by a processor in free format text. In this example, the first address 602 is "MZ #15-54 JOROBA C84 LT 4." Arrow 604 represents the extraction and storing of primary properties and the associated modifiers from the address into the address property container. The primary properties (i.e., numbers in the address) are extracted and stored into a primary property container 606 which contains property elements 606A, 606B, 606C, and 606D. Accordingly, the extracted primary properties are: (a) "84" in property element 606A, (b) "54" in property element 606B, (c) "15" in property element 606C, and (d) "4" in property element 606D.

The modifiers associated with each primary property are the strings or tokens on either side of each primary property. The modifiers associated with each primary property are extracted and stored into a property modifier container that is linked to the corresponding primary property. Accordingly, for primary property "84," the associated modifiers (i.e., the characters on either side of the number) are ["JOROBA, "C"] and "LT," which are stored into property modifier container 608A. Primary property element 606A is linked to property modifier container 608A as indicated by linking arrow 610. For primary property "54," the associated modifiers "-" (for the hyphen) and ["JOROBA", "C"] are stored into property modifier container 608B, which is linked to the primary property element 606B by linking arrow 610B. For primary property "15," the associated modifiers ["MZ", "#"] and "-" (for the hyphen), are stored into property modifier container 608C, which is linked to the primary property element 606C by linking arrow 610C. For primary property "4," the associated modifiers "LT" and "Null", are stored into property modifier container 608D, which is linked to the primary property element 606D by linking arrow 610D.

FIG. 5C illustrates the process 500 in operation for the second address 702. More specifically, as illustrated in FIG. 5C, the second address 702 is received by a processor in free format text. In this example, the second address 702 is "J 84 C #54-15-4." Arrow 704 represents the extraction and storing of primary properties and the associated modifiers from the address into the address property container. The primary properties (i.e., numbers in the address) are extracted and stored into a primary property container 706 which contains property elements 706A, 706B, 706C, and 706D. Accordingly, the extracted primary properties are: (a) "84" in property element 706A, (b) "54" in property element 706B, (c) "15" in property element 706C, and (d) "4" in property element 706D.

The modifiers associated with each primary property are extracted and stored into the following property modifier containers: (a) for primary property "84," the associated modifiers "J," ["C", "#"] are stored into property modifier container 708A, which is linked to the primary property element 706A; (b) for primary property "54," the associated modifiers ["C", "#"] and "-" (for the hyphen), are stored into property modifier container 708B, which is linked to the primary property element 706B by linking arrow 710B; (c) for primary property "15," the associated modifiers "-" and "-" (for the hyphens), are stored into property modifier container 708C, which is linked to the primary property element 706C by linking arrow 710C; and (d) for primary property "4," the associated modifiers "-" (for the hyphens) and "Null", are stored into property modifier container 708D, which is linked to the primary property element 706D by linking arrow 710D.

After the primary properties and the modifiers are extracted from the first address and the second address, and the properties are stored into the address property container, the address matching system and method includes comparing the primary properties at the primary property matching engine 152. The primary properties of the two or more addresses are compared to determine whether there is a mismatch. In this example embodiment, the primary properties of the first address 602 all match the primary properties of the second address 702, therefore there is no mismatch.

It should be appreciated that it is not necessary for all of the primary properties to match for there to be a "no mismatch" determination. If the primary property comparison does not result in a mismatch determination, the primary property comparison results in a determination of one of different levels of "subset of" relationships. In various embodiments, the comparison of primary properties renders a fine resolution on different levels of similarity between the primary properties of the addresses. For example, the comparison of primary properties of two or more addresses could render an exact match (i.e., 1, 2, 3 vs 1, 2, 3) or different levels of "subset of" relationship (i.e., (1, 2, 3 vs 1, 2) and (1, 2, 3 vs 3)).

Figure 6:
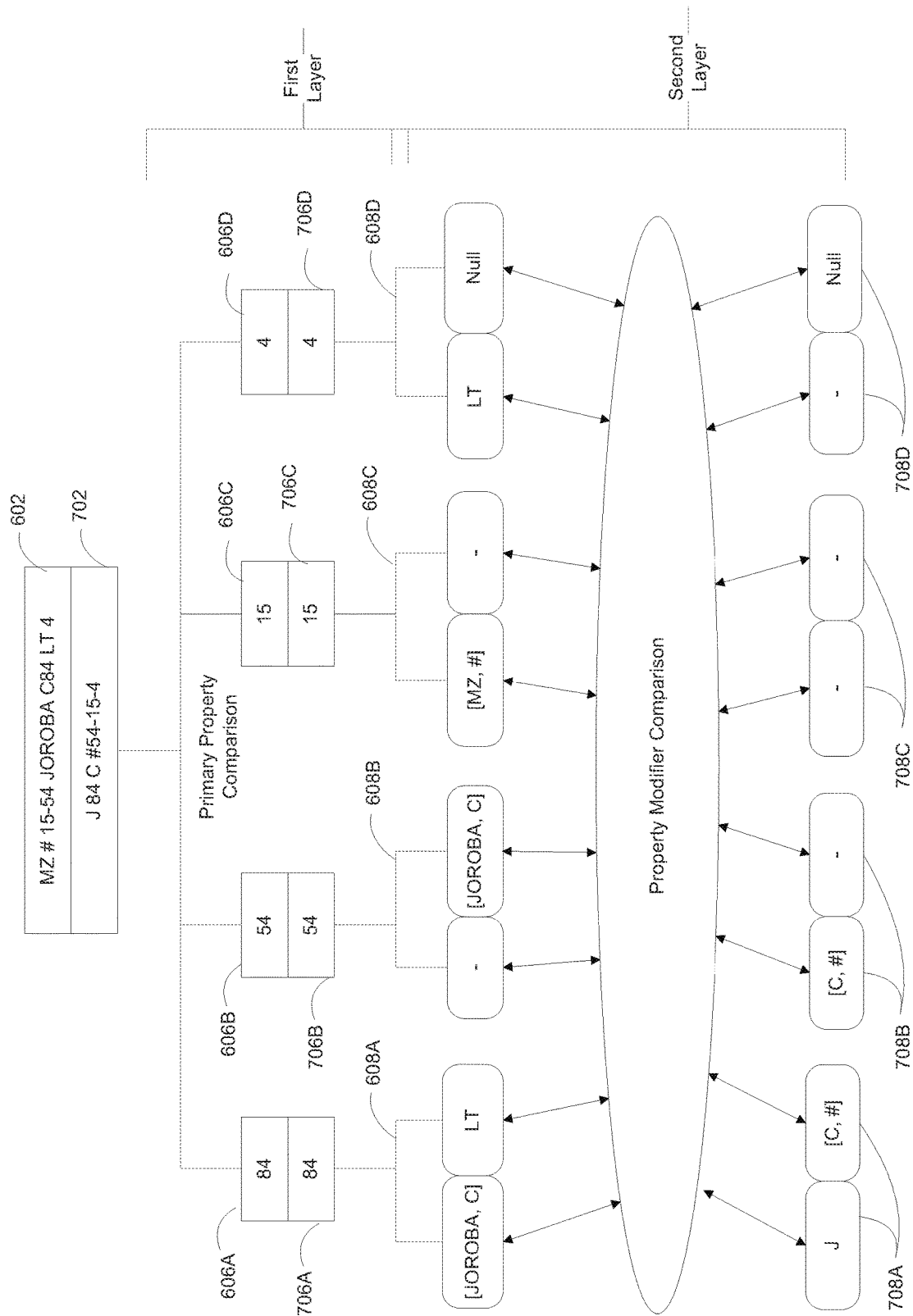
FIG. 6 is a diagram illustrating operations for the example embodiment of performing the layered address matching analysis of the present disclosure as described in FIGS. 5B-5C.

Turning to FIG. 6, which illustrates a diagram for the address comparison from FIGS. 5B and 5C. As illustrated, the primary property elements 606A, 606B, 606C, 606D of the first address 602 are compared to the primary property elements 706A, 706B, 706C, 706D of the second address 702. In this example embodiment, because the primary property comparison does not result in a mismatch in the first layer of matching, the modifiers associated with each primary property are compared at the property modifier matching engine 154 in the second layer of matching.

In the second layer of matching, the modifiers associated with a first primary property element 606A of the first address 602 are compared to the modifiers associated with the corresponding primary property element 706A (if any) of the second address 702. More specifically, for the first address 602, for primary property element "84" 606A, the associated modifiers are ["JOROBA", "C"] and "LT" as indicated by modifier address property container 608A and by linking arrow 610A in FIG. 5B. For the corresponding primary property element "84" 706A of the second address 702, the associated modifiers are "J" and ["C", "#"] as indicated by modifier address property container 708A and linking arrow 710A in FIG. 5C. The modifiers associated with "84" of the first address 602 are compared to the modifiers associated with "84" of the second address 702.

For the common primary property "84," both addresses 602, 702 include a common modifier "C." and a partial string match between "JOROBA" and "J." As such, this first comparison results in a match. Similarly, for the second common primary property "54," both addresses 602, 702 include common modifiers "-" and "C." For the third common primary property "15," both addresses 602, 702 include common modifier "-." For the fourth common primary property "4," both addresses include common modifier "Null." In this embodiment, because the associated modifiers for each of the primary properties results in at least one match, the two addresses are deemed to be a match.

It should be appreciated that in various embodiments, the threshold of comparison on modifiers varies based on the characteristics of addresses including the primary property matching result as well as external factors such as the market and the source of addresses. In this example embodiment, for each primary property, at least one modifier associated with the primary property from the first address matches with at least one modifier associated with the corresponding primary property from the second address. In certain alternative embodiments, the threshold of comparison may require less matches between the modifiers. For example, in certain embodiments two addresses may be deemed a match so long as at least one modifier associated with at least one common primary property of a first address matches at least one modifier associated with the corresponding common primary property of the second address. In other embodiments, the threshold of comparison may require more matches between the modifiers.

It should be appreciated that in various embodiments of the present disclosure, the weighting factor is applied to the different layers of the comparison approach. Other address matching approaches include assigning different weight based on a predetermined order of importance of different components of the address. One problem with this approach is that in different locales, different countries and regions place importance on different components of an address. By contrast, in the present disclosure there is no pre-determined order of importance. The first layer comes in for the primary property comparison and naturally receives the highest weight. By the same token, the subsequent layers have their weighting factor correspondingly. The modifier comparison adjusts the upper layer, i.e., the primary property comparison. For example, if the addresses being compared do not include numbers, the first layer (comparison of the primary properties) is given less weight. In such an embodiment, no primary properties are extracted and as such, there is no mismatch determination in the first layer of the comparison. In this embodiment, the second layer of comparison i.e., the comparison of the modifiers is given more weight than in embodiments where there are many primary properties that match. It should be appreciated that the weight given to the primary properties may also vary comparison to comparison. For example, when comparing two addresses that have many numbers in the address, the primary property extraction and comparison is going to be more decisive than if comparing two addresses with fewer numbers.

As described above, any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A method for matching addresses, the method comprising:
   receiving first address data and second address data;
   extracting, by a processor, any primary properties of the first address data and any primary properties of the second address data;
   comparing, by the processor, any extracted primary properties of the first address data to any extracted primary properties of the second address data; and
   responsive to the comparison resulting in no conflicting extracted primary properties existing between the first address data and the second address data:
      comparing, by the processor, extracted modifiers associated with the first address data to extracted modifiers associated with the second address data, and
      responsive to the comparison resulting in at least one of the extracted modifiers associated with the first address data matching at least one of the extracted modifiers associated with the second address data, transmitting a match notification.

2. The method of claim 1, further comprising, responsive to the comparison resulting in conflicting extracted primary properties between the first address data and the second address data, transmitting a mismatch notification without any comparing of any extracted modifiers of the first address data and any extracted modifiers of the second address data.

3. The method of claim 1, further comprising, responsive to the comparison resulting in conflicting extracted primary properties between the first address data and the second address data, rejecting, by the processor, the first address data and the second address data as unmatched addresses without any comparing of any extracted modifiers of the first address data and any extracted modifiers of the second address data.

4. The method of claim 1, further comprising, responsive to the comparison resulting in the at least one of the extracted modifiers associated with the first address data matching the at least one of the extracted modifiers associated with the second address data, causing a modification, based on the match and by the processor, of a database comprising the first address data and the second address data, wherein prior to the modification, the database comprised a plurality of unstructured, incomplete and/or inconsistently formatted data from a free form data source.

5. The method of claim 1, wherein the extraction of any primary properties of the first address data and any primary properties of the second address data comprises deconstructing, by the processor, of strings in the first address data and the second address data.

6. The method of claim 1, wherein the comparison of extracted modifiers associated with the first address data to extracted modifiers associated with the second address data comprises determining, by the processor, whether a number of matching modifiers exceeds a modifier comparison threshold associated with a match of the first address data and the second address data.

7. The method of claim 6, wherein the comparison of extracted modifiers associated with the first address data to extracted modifiers associated with the second address data results in at least one of the extracted modifiers associated with the first address data matching at least one of the extracted modifiers associated with the second address data responsive to the determination being that the number of matching modifiers exceeds the modifier comparison threshold.

8. The method of claim 1, wherein the primary properties are numbers.

9. The method of claim 8, wherein the modifiers are strings on either side of the corresponding primary property.

10. The method of claim 8, wherein the primary properties comprise at least one of: an apartment number, a house number, a post office box, a floor, a building, a complex, a street, a geographical direction, a district, a tehsil, a stand number, a barrio, a village, a suburb, a town, a city, and a state.

11. The method of claim 1, wherein the extracting any primary properties of the first address data and any primary properties of the second address data comprises deterministically evaluating, by the processor, a first string in the first address data to identify primary properties of the first address data, and deterministically evaluating, by the processor, a second string in the second address data to identify primary properties of the second address data.

12. The method of claim 1, further comprising storing any extracted primary properties into primary property containers, and storing any extracted modifiers into property modifier containers such that each property modifier container includes the extracted modifiers associated with the same primary property.

13. A system comprising:
   a processor; and
   a memory device that stores a plurality of instructions that, when executed by the processor, cause the processor to:
      receive first address data and second address data;

extract any primary properties of the first address data and any primary properties of the second address data;

compare any extracted primary properties of the first address data to any extracted primary properties of the second address data; and responsive to the comparison resulting in no conflicting extracted primary properties existing between the first address data and the second address data:

compare extracted modifiers associated with the first address data to extracted modifiers associated with the second address data, and responsive to the comparison resulting in at least one of the extracted modifiers associated with the first address data matching at least one of the extracted modifiers associated with the second address data, cause a transmission of a match notification.

14. The system of claim 13, wherein when executed by the processor responsive to the comparison resulting in conflicting extracted primary properties between the first address data and the second address data, the instructions cause the processor to cause a transmission of a mismatch notification without any comparison of any extracted modifiers of the first address data and any extracted modifiers of the second address data.

15. The system of claim 13, wherein when executed by the processor responsive to the comparison resulting in conflicting extracted primary properties between the first address data and the second address data, the instructions cause the processor to reject the first address data and the second address data as unmatched addresses without any comparison of any extracted modifiers of the first address data and any extracted modifiers of the second address data.

16. The system of claim 13, wherein when executed by the processor responsive to the comparison resulting in the at least one of the extracted modifiers associated with the first address data matching the at least one of the extracted modifiers associated with the second address data, the instructions cause the processor to cause a modification, based on the match, of a database comprising the first address data and the second address data, wherein prior to the modification, the database comprised a plurality of unstructured, incomplete and/or inconsistently formatted data from a free form data source.

17. The system of claim 13, wherein the extraction of any primary properties of the first address data and any primary properties of the second address data comprises a deconstruction of strings in the first address data and the second address data.

18. The system of claim 13, wherein the comparison of extracted modifiers associated with the first address data to extracted modifiers associated with the second address data comprises a determination of whether a number of matching modifiers exceeds a modifier comparison threshold associated with a match of the first address data and the second address data.

19. The system of claim 18, wherein the comparison of extracted modifiers associated with the first address data to extracted modifiers associated with the second address data results in at least one of the extracted modifiers associated with the first address data matching at least one of the extracted modifiers associated with the second address data responsive to the determination being that the number of matching modifiers exceeds the modifier comparison threshold.

20. The system of claim 13, wherein the primary properties are numbers.

21. The system of claim 20, wherein the modifiers are strings on either side of the corresponding primary property.

22. The system of claim 20, wherein the primary properties comprise at least one of: an apartment number, a house number, a post office box, a floor, a building, a complex, a street, a geographical direction, a district, a tehsil, a stand number, a barrio, a village, a suburb, a town, a city, and a state.

23. The system of claim 13, wherein the extraction of any primary properties of the first address data and any primary properties of the second address data comprises a deterministic evaluation of a first string in the first address data to identify primary properties of the first address data, and a deterministic evaluation of a second string in the second address data to identify primary properties of the second address data.

24. The system of claim 13, wherein when executed by the processor, the instructions cause the processor to:

store any extracted primary properties into primary property containers, and store any extracted modifiers into property modifier containers such that each property modifier container includes the extracted modifiers associated with the same primary property.

* * * * *